United States Patent
Hiratani et al.

(10) Patent No.: US 12,441,876 B2
(45) Date of Patent: Oct. 14, 2025

(54) CURABLE RESIN COMPOSITION AND CURED PRODUCT THEREOF, AND METHOD FOR PRODUCING THREE-DIMENSIONAL SHAPED PRODUCT

(71) Applicant: CANON KABUSHIKI KAISHA, Tokyo (JP)

(72) Inventors: Takayuki Hiratani, Tokyo (JP); Kyohei Wada, Tokyo (JP); Ryo Ogawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 865 days.

(21) Appl. No.: 17/528,636

(22) Filed: Nov. 17, 2021

(65) Prior Publication Data

US 2022/0073725 A1    Mar. 10, 2022

Related U.S. Application Data

(63) Continuation of application No. PCT/JP2020/020313, filed on May 22, 2020.

(30) Foreign Application Priority Data

May 24, 2019 (JP) .................................. 2019-097824
Apr. 21, 2020 (JP) .................................. 2020-075420

(51) Int. Cl.
| | | |
|---|---|---|
| C08L 51/04 | (2006.01) | |
| B29C 64/106 | (2017.01) | |
| B33Y 70/00 | (2020.01) | |
| B33Y 80/00 | (2015.01) | |
| C08F 136/06 | (2006.01) | |
| C08F 220/14 | (2006.01) | |
| C08F 220/18 | (2006.01) | |
| C08F 222/10 | (2006.01) | |
| C08F 222/40 | (2006.01) | |
| C08F 226/06 | (2006.01) | |
| C08F 279/02 | (2006.01) | |

(52) U.S. Cl.
CPC ............ *C08L 51/04* (2013.01); *B29C 64/106* (2017.08); *C08F 136/06* (2013.01); *C08F 220/14* (2013.01); *C08F 220/1811* (2020.02); *C08F 222/1061* (2020.02); *C08F 222/1065* (2020.02); *C08F 222/40* (2013.01); *C08F 226/06* (2013.01); *C08F 279/02* (2013.01); *B33Y 70/00* (2014.12); *B33Y 80/00* (2014.12); *C08L 2207/53* (2013.01); *C08L 2312/06* (2013.01)

(58) Field of Classification Search
CPC ........ C08L 51/04; C08L 75/16; C08F 265/04; C08F 265/06; C08F 279/02; C08F 220/1811; C08F 222/1061; C08F 222/1065

See application file for complete search history.

(56) References Cited

U.S. PATENT DOCUMENTS

| | | | |
|---|---|---|---|
| 7,695,813 B2* | 4/2010 | Schultes | C08F 285/00 428/407 |
| 9,809,731 B2 | 11/2017 | Niimi et al. | |
| 11,840,597 B2 | 12/2023 | Hiratani et al. | |
| 2009/0239968 A1 | 9/2009 | Kiyoyanagi et al. | |
| 2014/0287167 A1 | 9/2014 | Ooga | |
| 2019/0315979 A1 | 10/2019 | Hiratani et al. | |
| 2021/0171760 A1* | 6/2021 | Gupta | C08L 75/16 |
| 2021/0230341 A1 | 7/2021 | Hiratani et al. | |
| 2022/0073669 A1 | 3/2022 | Hiratani et al. | |

FOREIGN PATENT DOCUMENTS

| | | | |
|---|---|---|---|
| CN | 101495526 A | | 7/2009 |
| CN | 104011100 A | | 8/2014 |
| CN | 105992804 A | | 10/2016 |
| CN | 112888719 A | | 6/2021 |
| JP | 2000-351819 A | | 12/2000 |
| JP | 2004-051665 A | | 2/2004 |
| JP | 2006-002110 A | | 1/2006 |
| JP | 2009295797 A | * | 12/2009 |
| JP | 2011-213952 A | | 10/2011 |
| JP | 2013-112715 A | | 6/2013 |
| JP | 2014-201688 A | | 10/2014 |
| JP | 2015-007191 A | | 1/2015 |
| JP | 2015-164981 A | | 9/2015 |
| JP | 2015-193725 A | | 11/2015 |
| JP | 2017-095551 A | | 6/2017 |
| JP | 2021-169597 A | | 10/2021 |
| WO | 2013/099985 A1 | | 7/2013 |

(Continued)

OTHER PUBLICATIONS

Partial machine translation of JP 2006-002110 (Year: 2006).*
Partial machine translation of JP 2009-295797 (Year: 2009).*
Partial machine translation of JP 2014-201688 (Year: 2014).*
Notice of Reasons for Refusal in Japanese Application No. 2020-089617 (Jan. 2024).
Extended European Search Report in European Application No. 20813501.2 (Jun. 2023).
Notice of Reasons for Refusal in Japanese Patent Application No. 2020-089617 (May 2024).

(Continued)

*Primary Examiner* — Kregg T Brooks
(74) *Attorney, Agent, or Firm* — Venable LLP

(57) ABSTRACT

To provide a low-viscosity curable resin composition capable of obtaining a cured product excellent in impact resistance. The curable resin composition contains core-shell type rubber particles, a radically polymerizable compound having one or more radically polymerizable functional groups in the molecule, and a radical polymerization initiator, and the core-shell type rubber particles have a core layer and a shell layer containing a polymer having an alicyclic hydrocarbon group in a side chain, and the radically polymerizable compound contains a radically polymerizable compound having a molecular weight of 500 or more in a ratio of 2 mass % to 70 mass %.

20 Claims, No Drawings

(56) References Cited

FOREIGN PATENT DOCUMENTS

| WO | 2018/147242 A1 | 8/2018 |
| WO | 2018/165090 A1 | 9/2018 |
| WO | 2020/085166 A1 | 4/2020 |
| WO | 2020/241501 A1 | 12/2020 |
| WO | 2020/241502 A1 | 12/2020 |

OTHER PUBLICATIONS

Hiratani et al., U.S. Appl. No. 17/528,659, filed Nov. 17, 2021.
International Search Report in International Application No. PCT/JP2020/020313 (Aug. 2020).
Notice of Reasons for Refusal in Japanese Application No. 2020-089618 (Jul. 2024).
First Office Action in Chinese Application No. 202080037277.5 (May 2023).
Second Office Action in Chinese Application No. 202080037277.5 (Dec. 2023).
International Preliminary Report on Patentability in International Application No. PCT/JP2020/020313 (Dec. 2021).

* cited by examiner

CURABLE RESIN COMPOSITION AND CURED PRODUCT THEREOF, AND METHOD FOR PRODUCING THREE-DIMENSIONAL SHAPED PRODUCT

CROSS-REFERENCE TO RELATED APPLICATIONS

This application is a Continuation of International Patent Application No. PCT/JP2020/020313, filed May 22, 2020, which claims the benefit of Japanese Patent Application No. 2019-097824, filed May 24, 2019 and Japanese Patent Application No. 2020 075420, filed Apr. 21, 2020, all of which are hereby incorporated by reference herein in their entirety.

BACKGROUND OF THE INVENTION

Field of the Invention

The present disclosure relates to a curable resin composition, a cured product thereof, and a method for producing a three-dimensional shaped product.

Description of the Related Art

There is known an optical shaping method (hereinafter referred to as "stereolithography") for manufacturing a shaped product in which a cured resin layer is integrally laminated by repeating a process of selectively irradiating a photocurable resin composition with light based on the three-dimensional shape of a three-dimensional model to form a cured resin layer.

Specifically, according to the slice data generated from the three-dimensional shape data of the three-dimensional model to be produced, the liquid surface of the liquid photocurable resin composition housed in the container is irradiated with light such as an ultraviolet laser to form a cured resin layer having a desired pattern with a predetermined thickness. Then, a photocurable resin composition for one layer is supplied onto the cured resin layer and similarly irradiated with light to form a new cured resin layer continuous with the previously formed cured resin layer. In this way, by laminating the cured resin layer in a pattern based on the slice data, a desired three-dimensional shaped product can be obtained. According to such a stereolithography, if three-dimensional shape data of a three-dimensional model exists, even a three-dimensional object having a complicated shape can be easily produced.

Applications of stereolithography are advancing to prototype modeling (rapid prototyping) for shape confirmation and working model modeling and mold modeling (rapid tooling) for functional verification. In recent years, the application of stereolithography has begun to spread to the production of real products (rapid manufacturing).

Against this background, there is a need for a photocurable resin composition capable of forming a three-dimensional shaped product having high impact resistance comparable to general-purpose engineering plastics.

Japanese Patent Application Laid-Open No. 2004-51665 discloses a curable resin composition containing urethane (meth) acrylate, another radically polymerizable compound, and elastomer particles having a core/shell structure, and an improvement in impact resistance by combining a flexible urethane (meth) acrylate component with the elastomer particles is studied.

However, in Japanese Patent Application Laid-Open No. 2004-51665, since the viscosity of the radically polymerizable compound containing urethane (meth) acrylate is high and the workability in producing the cured product is not impaired, it is necessary to suppress the addition amount of the elastomer particles causing a remarkable increase in viscosity to be low, and the impact resistance of the cured product is not sufficient.

Therefore, it is an object of the present disclosure to provide a low-viscosity curable resin composition capable of obtaining a cured product excellent in impact resistance.

SUMMARY OF THE INVENTION

A curable resin composition according to an embodiment of the present disclosure comprises:
 a core-shell type rubber particle;
 a radically polymerizable compound having one or more radically polymerizable functional groups in the molecule;
 a radical polymerization initiator, wherein
 the core-shell type rubber particle has a core layer and a shell layer containing a polymer having an alicyclic hydrocarbon group in a side chain, and
 the radically polymerizable compound contains 2 mass % to 70 mass % of radically polymerizable compound having 500 or more molecular weight.

Further features of the present invention will become apparent from the following description of exemplary embodiments.

DESCRIPTION OF THE EMBODIMENTS

Embodiments of the present disclosure will be described below. It should be noted that the embodiments described below are only one embodiment of the present disclosure, and the present disclosure is not limited to these embodiments.

(Core-Shell Type Rubber Particle)

The core-shell type rubber particle has a core layer and a shell layer containing a polymer having an alicyclic hydrocarbon group in a side chain. Since the shell layer of the core-shell type rubber particle contains a polymer having an alicyclic hydrocarbon group in the side chain, the increase in viscosity of the curable resin composition when the core-shell type rubber particle is dispersed in the curable resin composition containing the radically polymerizable compound can be suppressed.

The core layer of the core-shell type rubber particle is composed of particles of a polymer containing a rubbery elastic body. The kinds of particles of the polymer containing the rubbery elastic body constituting the core layer are not particularly limited. Preferred polymers include, for example, butadiene rubber, styrene/butadiene copolymer rubber, acrylonitrile/butadiene copolymer rubber, saturated rubber obtained by hydrogenating or partially hydrogenating these diene rubbers, crosslinked butadiene rubber, isoprene rubber, chloroprene rubber, natural rubber, silicone rubber, ethylene/propylene/diene monomer ternary copolymer rubber, acrylic rubber, silicone/acrylic composite rubber, urethane rubber, and the like. The polymers in the particles may be used alone or in combination of two or more. In particular, from the viewpoint of flexibility, at least one kind selected from butadiene rubber, crosslinked butadiene rubber, styrene/butadiene copolymer rubber, acrylic rubber, silicone/acrylic composite rubber, and urethane rubber is preferably used as the polymer. The glass transition temperature of the polymer constituting the core layer is preferably less than 20° C. When the glass transition temperature is less than 20° C., it is preferable because it facilitates functioning as an impact absorber in a cured product at room temperature.

The shell layer contains a polymer having an alicyclic hydrocarbon group in a side chain. Specifically, the surface of the polymer particles serving as the core layer is covered with a shell layer containing a polymer such as a radically polymerizable compound having an alicyclic hydrocarbon group.

The polymer having an alicyclic hydrocarbon group in the side chain is graft-polymerized on the surface of the core layer through chemical bonds, and preferably covers a part or the whole of the surface of the core layer. The core-shell type rubber particle formed by graft-polymerizing a shell layer to a core layer can be formed by graft-polymerizing a radically polymerizable compound having an alicyclic hydrocarbon group forming the shell layer by a known method in the presence of particles to be the core layer. For example, it can be produced by adding a radically polymerizable compound having an alicyclic hydrocarbon group forming a shell layer to latex particles dispersed in water and polymerizing the latex particles, which can be prepared by emulsion polymerization, miniemulsion polymerization, suspension polymerization, or the like. When the surface of the core layer does not have reactive sites such as an ethylenically unsaturated group on which the shell layer can be graft-polymerized or there are very few reactive sites, an intermediate layer containing the reactive sites may be provided on the surface of the particles serving as the core layer, and then the radically polymerizable compound having an alicyclic hydrocarbon group forming the shell layer may be graft-polymerized. That is, the core-shell type rubber particle also includes a core-shell type rubber particle in which a shell layer is provided in the core layer through an intermediate layer.

Examples of the alicyclic hydrocarbon group-containing radically polymerizable compound forming the shell layer include isobornyl (meth) acrylate, dicyclopentanyl (meth) acrylate, dicyclopentenyl (meth) acrylate, cyclohexyl (meth) acrylate, 2-methyl-2-adamantyl (meth) acrylate, 2-ethyl-2-adamantyl (meth) acrylate, dimethylol tricyclodecandi (meth) acrylate, cyclohexylmaleimide, and the like.

The shell layer may also include other polymers. The other polymer is not particularly limited, but a polymer of a monofunctional radically polymerizable compound having one radically polymerizable functional group in the molecule can be suitably used. The monofunctional radically polymerizable compound can be appropriately selected from the viewpoint of compatibility with the core layer and dispersibility in the resin composition, and one or more compounds may be used in combination from the compounds exemplified as radically polymerizable compounds constituting the curable resin composition described later.

As the shell layer, a polymer of a polyfunctional radically polymerizable compound may be used in combination as another polymer. The polyfunctional radically polymerizable compound is preferably 0 to 40 parts by mass based on 100 parts by mass of the radically polymerizable compound used for forming the shell layer. Further, 0 to 30 parts by mass is more preferable, and 0 to 25 parts by mass is particularly preferable. When the content of the polyfunctional radically polymerizable compound is 40 parts by mass or less, the effect of improving impact resistance by the addition of the core-shell type rubber particle is easily obtained. The polyfunctional radically polymerizable compound can be appropriately selected from the viewpoints of compatibility with the core layer and dispersibility in the resin composition, and one or two or more radically polymerizable compounds constituting the curable resin composition described later may be used in combination.

The radically polymerizable functional group of the radically polymerizable compound forming the shell layer includes an ethylenically unsaturated group. Specifically, the ethylenically unsaturated group includes a (meth)acryloyl group, a vinyl group, and the like. In this specification, the (meth)acryloyl group means an acryloyl group and/or a methacryloyl group.

Examples of the radically polymerizable compound having a (meth)acryloyl group include (meth)acrylamide compounds and (meth)acrylate compounds. In this specification, the term (meth)acrylamide compound means a compound having a methacrylamide group in the molecule or a compound having an acrylamide group in the molecule. The (meth)acrylate compound means a compound having an acrylate group in the molecule or a compound having a methacrylate group in the molecule.

[Monofunctional Radically Polymerizable Compound]

Examples of the monofunctional (meth)acrylamide-based compound having one radically polymerizable functional group in the molecule include (meth)acrylamide, N-methyl (meth)acrylamide, N-isopropyl (meth)acrylamide, N-tert-butyl (meth)acrylamide, N-phenyl (meth)acrylamide, N-methylol (meth)acrylamide, N, N-diacetone (meth)acrylamide, N, N-dimethyl (meth)acrylamide, N, N-diethyl (meth)acrylamide, N, N-dipropyl (meth)acrylamide, N, N-dibutyl (meth)acrylamide, N-(meth)acryloylmorpholine, and the like.

As monofunctional (meth)acrylate-based compounds having one radically polymerizable functional group in the molecule, for example, methyl (meth)acrylate, ethyl (meth)acrylate, n-butyl (meth)acrylate, isobutyl (meth)acrylate, t-butyl (meth)acrylate, 2-ethylhexyl (meth)acrylate, n-octyl (meth)acrylate, i-octyl (meth)acrylate, lauryl (meth)acrylate, stearyl (meth)acrylate, cyclohexyl (meth)acrylate, isobornyl (meth)acrylate, adamantyl (meth)acrylate, 2-hydroxyethyl (meth)acrylate, 2-hydroxypropyl (meth)acrylate, 2-hydroxybutyl (meth)acrylate, 4-hydroxybutyl (meth)acrylate, glycidyl (meth)acrylate, 3-methyl-3-oxetanyl-methyl (meth)acrylate, tetrahydrofurfuryl (meth)acrylate, phenylglycidyl (meth)acrylate, dimethylaminomethyl (meth)acrylate, phenylcellosolve (meth)acrylate, dicyclopentenyl (meth)acrylate, dicyclopentenyloxyethyl (meth)acrylate, biphenyl (meth)acrylate, 2-hydroxyethyl (meth)acryloyl phosphate, phenyl (meth)acrylate, phenoxyethyl (meth)acrylate, phenoxypropyl (meth)acrylate, benzyl (meth)acrylate, butoxytriethylene glycol (meth)acrylate, 2-ethylhexylpolyethylene glycol (meth)acrylate, nonylphenyl polypropylene glycol (meth)acrylate, methoxydipropylene glycol (meth)acrylate, glycidyl (meth)acrylate, glycerol (meth)acrylate, trifluoromethyl (meth)acrylate, trifluoroethyl (meth)acrylate, tetrafluoropropyl (meth)acrylate, octafluoropentyl acrylate, polyethyleneglycol (meth)acrylate, polypropylene glycol (meth)acrylate, allyl (meth)acrylate, epichlorohydrin-modified butyl (meth)acrylate, epichlorohydrin-modified phenoxy (meth)acrylate, ethylene oxide (EO) modified phthalic acid (meth)acrylate, EO modified succinic acid (meth)acrylate, caprolactone-modified 2-hydroxyethyl (meth)acrylate, N,N-dimethylaminoethyl (meth)acrylate, N,N-diethylaminoethyl (meth)acrylate, morpholino (meth) acrylate, EO modified phosphoric acid (meth)acrylate, methyl allyloxyacrylate (Product name: AO-MA, manufactured by Nippon Shokubai), monofunctional (meth)acrylates having an imide group (product name: M-140, manufactured by TOAGOSEI), and monofunctional (meth)acrylates having a siloxane structure.

Examples of monofunctional radically polymerizable compounds having ethylenically unsaturated groups other than (meth)acryloyl groups include styrene derivatives such as styrene, vinyltoluene, a-methylstyrene, chlorostyrene, styrenesulfonic acid and salts thereof, maleimides such as maleimide, methylmaleimide, ethylmaleimide, propylmaleimide, butylmaleimide, hexylmaleimide, octylmaleimide, dodecylmaleimide, stearylmaleimide, phenylmaleimide, vinyl esters such as vinyl acetate, vinyl propionate, vinyl pivalate, vinyl benzoate, vinyl cinnamate, vinyl cyanide compounds such as (meth)acrylonitrile, N-vinyl compounds such as N-vinylpyrrolidone, N-vinylcaprolactam, N-vinylimidazole, N-vinylmorpholine, N-vinylacetamide, and the like.

These monofunctional radically polymerizable compounds may be used alone or in combination of two or more.

From the viewpoint of accelerating the curing rate, when the monofunctional radically polymerizable compound is contained, at least one kind selected from a monofunctional (meth)acrylamide compound, a monofunctional (meth)acrylate compound and an N-vinyl compound is preferably contained. In particular, it is preferable to contain a monofunctional acrylamide compound or an N-vinyl compound.

[Multifunctional Radically Polymerizable Compound]

Examples of the polyfunctional radically polymerizable compound having two or more radically polymerizable functional groups in the molecule include a polyfunctional (meth)acrylate compound, a vinyl ether group-containing (meth)acrylate compound, a polyfunctional (meth)acrylamide compound, a polyfunctional urethane (meth)acrylate compound, a polyfunctional maleimide compound, a polyfunctional vinyl ether compound, a polyfunctional aromatic vinyl compound, and the like.

The polyfunctional (meth)acrylate-based compounds include, for example, ethylene glycol di(meth)acrylate, diethylene glycol di(meth)acrylate, triethylene glycol di(meth)acrylate, tetraethylene glycol di(meth)acrylate, nonaethylene glycol di(meth)acrylate, 1,3-butylene glycol di(meth)acrylate, 1,4 butanediol di(meth)acrylate, dimethylol tricyclodecane di(meth)acrylate, trimethylol propane tri(meth)acrylate, neopentyl glycol di(meth)acrylate, 1,6-hexamethylene di(meth)acrylate, hydroxypivalic acid ester neopenthyl glycol di(meth)acrylate, pentaerythritol tetra(meth)acrylate, ditrimethylol propane tetraacrylate, dipentaerythritol tetra(meth)acrylate, dipentaerythritol penta (meth)acrylate, dipentaerythritol hexa(meth)acrylat, tri(acryloyloxyethyl) isocyanurate, tri(methacryloyloxyethyl) isocyanurate, di(meth)acrylate of the F-caprolactone adduct of F-caprolactone modified tris-(2-acryloxyethyl) isocyanurate hydroxypivalate neopentyl glycol, di(meth)acrylate of the EO adduct of bisphenol A, polycarbonate diol di(meth)acrylate, polyester di(meth)acrylate, polyethylene glycol di(meth)acrylate, polypropylene glycol di(meth)acrylate, polytetramethylene glycol di(meth)acrylate, polyfunctional urethane (meth)acrylate, polyfunctional (meth)acrylate having a fluorine atom, polyfunctional (meth)acrylate, polyfunctional (meth)acrylate having a polyfunctional siloxane structure, etc.

Examples of the multifunctional vinyl ether group-containing (meth)acrylate-based compound include 2-vinyloxyethyl (meth)acrylate, 4-vinyloxybutyl (meth)acrylate, 4-vinyloxycyclohexyl (meth)acrylate, 2-(vinyloxyethoxy) ethyl (meth)acrylate, 2-(vinyloxyethoxyethoxy) ethyl (meth)acrylate and the like.

Examples of the polyfunctional (meth)acrylamide-based compound include N,N'-methylenebisacrylamide, N,N'-ethylenebisacrylamide, N,N'-(1,2-dihydroxyethylene) bisacrylamide, N,N'-methylenebismethacrylamide, N,N'N'-triacryloyldiethylenetriamine, and the like.

Multifunctional maleimide-based compounds include, for example, 4,4'-diphenylmethane bismaleimide, m-phenylene bismaleimide, bisphenol A diphenyl ether bismaleimide, 3,3'-dimethyl-5,5'-diethyl-4,4'-diphenylmethane bismaleimide, 4-methyl-1,3-phenylene bismaleimide, 1,6-bismaleimide-(2,2,4-trimethyl) hexane, and the like.

The polyfunctional vinyl ether-based compound includes, for example, ethylene glycol divinyl ether, diethylene glycol divinyl ether, polyethylene glycol divinyl ether, propylene glycol divinyl ether, butylene glycol divinyl ether, hexanediol divinyl ether, bisphenol A alkylene oxide divinyl ether, bisphenol F alkylene oxide divinyl ether, trimethylolpropane trivinyl ether, ditrimethylol propane tetra vinyl ether, glycerol trivinyl ether, pentaerythritol tetra vinyl ether, dipentaerythritol penta vinyl ether, dipentaerythritol hexa vinyl ether, etc.

Examples of the polyfunctional aromatic vinyl compound include divinylbenzene.

These polyfunctional radically polymerizable compounds may be used alone or in combination of two or more.

The ratio of the polymer of the radically polymerizable compound having the alicyclic hydrocarbon group in the shell layer is preferably from 2 parts by mass to 100 parts by mass, more preferably from 5 parts by mass to 100 parts by mass, based on 100 parts by mass of the polymer forming the shell layer. When the ratio of the radically polymerizable compound having the alicyclic hydrocarbon group satisfies the above range, the increase in viscosity when contained in the curable resin composition can be effectively suppressed.

The ratio of the core layer to the shell layer in the core-shell type rubber particle is preferably 1 to 200 parts by mass, more preferably 2 to 180 parts by mass, with respect to 100 parts by mass of the core layer. When the mass ratio of the shell layer is 1 part by mass or more, the effect of improving impact resistance and the effect of reducing viscosity increase by containing the core-shell type rubber particle can be sufficiently obtained. Further, when the shell layer is 200 parts by mass or less, a sufficient impact resistance improving effect can be obtained without adding a large amount of core-shell type rubber particle, so that the viscosity of the curable resin composition becomes moderate and handling becomes easy.

The core-shell type rubber particle preferably has an average particle diameter of 0.02 μm to 5 μm, more preferably 50 nm to 2 μm. When the average particle diameter is 0.02 μm or more, the viscosity increase accompanying the addition and the interaction between the rubber particles accompanying the increase of the specific surface area of the rubber particles hardly occur, and the heat resistance and impact resistance of the cured product can be sufficiently obtained. When the average particle diameter is 5 μm or less, the dispersibility of the rubber particles in the curable resin composition can be sufficiently obtained, and the effect of improving the impact resistance can be sufficiently obtained. The average particle size of the core-shell type rubber particle in the present disclosure is an arithmetic (number) average particle size, and can be measured using a dynamic light scattering method. For example, rubber particles are dispersed in an organic solvent and can be measured using a particle size distribution measuring device.

The content of the core-shell type rubber particle in the curable resin composition is preferably 7 parts by mass or more and 65 parts by mass or less, more preferably 10 parts by mass or more and 60 parts by mass or less, based on 100 parts by mass of the radically polymerizable compound. When the content of the core-shell type rubber particle is within the above range, the effect of suppressing the increase in viscosity of the curable resin composition is remarkably exhibited. When the content of the core-shell type rubber particle is 7 parts by mass or more, it is preferable because the effect of improving impact resistance by adding the particle can be easily obtained. Further, when the content of the core-shell type rubber particle is 65 parts by mass or less, it is preferable because the core-shell type rubber particle is less likely to be forcibly brought into close proximity with each other in the curable resin composition, and the viscosity reduction effect due to the inclusion of an alicyclic hydrocarbon group in the shell layer can be easily obtained, and the appropriate viscosity facilitates handling.

<Radically Polymerizable Compound>

The radically polymerizable compound has one or more radically polymerizable functional groups in the molecule. In the curable resin composition of the present disclosure, a radically polymerizable compound having a molecular weight of 500 or more is contained in the radically polymerizable compound at a ratio of 2 mass % to 70 mass %. The radically polymerizable compound may further contain less than 50 mass % of a (meth) acrylate compound having an alicyclic hydrocarbon group. In the present disclosure, a radically polymerizable compound having a molecular weight of 500 or more and an alicyclic hydrocarbon group is included in a radically polymerizable compound having a molecular weight of 500 or more. Therefore, the molecular weight of the (meth) acrylate compound having the alicyclic hydrocarbon group is less than 500, and the sum of the proportion of the radically polymerizable compound having the molecular weight of 500 or more and the proportion of the (meth) acrylate compound having the alicyclic hydrocarbon group in the radically polymerizable compound does not exceed 100 mass %.

[Radically Polymerizable Compound with a Molecular Weight of 500 or More]

The radically polymerizable compound contains 2 mass % or more and 70 mass % or less of a radically polymerizable compound having a molecular weight of 500 or more. Preferably, a radically polymerizable compound having a molecular weight of 500 or more is contained in a ratio of 5 mass % to 65 mass %. When the proportion of the radically polymerizable compound having a molecular weight of 500 or more is 2 mass % or more, it is preferable because the impact resistance of the radically polymerizable cured product having a molecular weight of 500 or more is sufficient. In addition, when the proportion of the radically polymerizable compound having a molecular weight of 500 or more is 70 mass % or less, it is preferable because the viscosity reducing effect can be easily obtained and sufficient workability can be secured at the time of producing the cured product.

As the radically polymerizable compound having a molecular weight of 500 or more, a conventionally known radically polymerizable compound having an ethylenically unsaturated group can be used. Specifically, the ethylenically unsaturated group includes a (meth)acryloyl group, a vinyl group, and the like. As the radically polymerizable compound having a molecular weight of 500 or more, a radically polymerizable compound having a (meth)acryloyl group, especially a polyfunctional radically polymerizable compound having 2 or more (meth)acryloyl groups in the molecule can be suitably used. Examples include urethane-based (meth)acrylates, ether-based (meth)acrylates, ester-based (meth)acrylates, polycarbonate-based (meth)acrylates, and the like.

The urethane-based (meth)acrylate is obtained by urethanizing a polyol, an isocyanate compound and a (meth)acrylate compound having a hydroxyl group shown below. In addition, ether-based (meth)acrylates, ester-based (meth)acrylates, and polycarbonate-based (meth)acrylates can be obtained by reacting the corresponding polyols shown below (polyether polyol, polyester polyol, polycarbonate polyol) with (meth)acrylic acid.

Examples of the polyether polyol include polyethylene glycol, polyoxypropylene glycol, polytetramethylene ether glycol, copolymers of propylene oxide and ethylene oxide, copolymers of tetrahydrofuran and ethylene oxide, copolymers of tetrahydrofuran and propylene oxide, ethylene oxide adducts of bisphenol A, propylene oxide adducts of bisphenol A, and the like.

The polyester polyol is, for example, an adduct of a diol compound such as ethylene glycol, propylene glycol, diethylene glycol, dipropylene glycol, 1,5-pentanediol, 3-methyl-1,5-pentanediol, 1,6-hexanediol, neopentyl glycol and ε-caprolactam or β-methyl-δ-valerolactone; reaction product of the diol compound with a dibasic acid such as succinic acid, adipic acid, phthalic acid, hexahydrophthalic acid, tetrahydrophthalic acid; a three-component reaction product of the diol compound, the dibasic acid and F-caprolactam or β-methyl-δ-valerolactone can be cited.

The polycarbonate polyol includes, for example, a diol compound such as 1,6-hexanediol, 3-methyl-1,5-pentanediol, neopentyl glycol, 1,4-butanediol, 1,5-octanediol, 1,4-bis-(hydroxymethyl) cyclohexane, 2-methylpropanediol, dipropylene glycol, dibutylene glycol, bisphenol A, or a polycarbonate polyol comprising a reaction product of these diol compounds with 2-6 molar ethylene oxide and a short-chain dialkyl carbonate such as dimethyl carbonate or diethyl carbonate.

Further, polyester diol or the like which is an addition reaction product of ethylene oxide, propylene oxide and F-caprolactam or β-methyl-δ-valerolactone of the polycarbonate polyols can also be used.

Further, as the isocyanate compound, for example, tolylene diisocyanate, 4,4'-diphenylmethane diisocyanate, hydrogenated 4,4'-diphenylmethane diisocyanate, xylylene diisocyanate, hydrogenated xylylene diisocyanate, hexamethylene diisocyanate, isophorone diisocyanate, 1,5-naphthalene diisocyanate, tolydine diisocyanate, p-phenylene diisocyanate, transcyclohexane-1,4-diisocyanate, lysine diisocyanate, tetramethylxy diisocyanate, lysine ester triisocyanate, 1,6,11-undecane triisocyanate, 1,8-diisocyanate-4-isocyanatemethyoctane, 1,3,6-hexamethylene triisocyanate, bicycloheptane triisocyanate, trimethylhexamethylene diisocyanate, and the like are used.

The radically polymerizable compound having a molecular weight of 500 or more is preferably a urethane-based (meth)acrylate. Among them, a polyfunctional urethane (meth)acrylate having at least two (meth)acryloyl groups and at least two urethane groups in the molecule is preferable. The urethane-based (meth)acrylate preferably contains at least a polyether structure or a polyester structure. More preferably, the urethane-based (meth)acrylate contains a polyether structure. By using such a urethane-based (meth)acrylate, an alicyclic hydrocarbon group is contained in the shell layer of the core-shell type rubber particle, whereby the effect of reducing the viscosity of the curable resin composition can easily be obtained. Further, the effect of improving the impact resistance of the cured product of the curable resin composition can easily be obtained.

[(Meth)Acrylate-Based Compound Having Alicyclic Hydrocarbon Group]

The radically polymerizable compound contains less than 50 mass % of a (meth)acrylate compound having an alicyclic hydrocarbon group. The ratio of the (meth)acrylate compound having the alicyclic hydrocarbon group is preferably 48 mass % or less, more preferably 45 mass % or less. The radically polymerizable compound preferably contains a (meth)acrylate compound having an alicyclic hydrocarbon group in the above proportion, but may not contain a (meth)acrylate compound having an alicyclic hydrocarbon group. When the ratio of the (meth)acrylate compound having the alicyclic hydrocarbon group is 50 mass % or more, the viscosity of the curable resin composition tends to increase, and it is not preferable because workability in producing a cured product is impaired.

Examples of the (meth)acrylate-based compound having an alicyclic hydrocarbon group include isobornyl (meth)acrylate, dicyclopentanyl (meth)acrylate, dicyclopentenyl (meth)acrylate, cyclohexyl (meth)acrylate, 2-methyl-2-adamantyl (meth)acrylate, 2-ethyl-2-adamantyl (meth)acrylate and the like.

The radically polymerizable compound may contain a radically polymerizable compound having 1 or more radically polymerizable functional group in the molecule in addition to a radically polymerizable compound having 500 or more molecular weight and a (meth)acrylate compound having an alicyclic hydrocarbon group. As the radically polymerizable compound other than the radically polymerizable compound having a molecular weight of 500 or more and the (meth)acrylate compound having an alicyclic hydrocarbon group (hereinafter, it may be referred to as "other radically polymerizable compounds"), 1 or 2 kinds or more of compounds exemplified as the radically polymerizable compound forming the shell layer of the core-shell type rubber particles can be used in combination.

<Radical Polymerization Initiator (Component)>

As the radical polymerization initiator, a photoradical polymerization initiator or a thermal radical polymerization initiator can be used.

[Photoradical Polymerization Initiator]

Photoradical polymerization initiators are mainly classified into intramolecular cleavage type and hydrogen abstraction type. In an intramolecular cleavage-type photoradical polymerization initiator, a bond at a specific site is broken by absorbing light of a specific wavelength. Then, a radical is generated at the cut part, which serves as a polymerization initiator, and polymerization of a radically polymerizable compound such as an ethylenically unsaturated compound containing a (meth)acryloyl group starts. On the other hand, in the case of the hydrogen abstraction type, light of a specific wavelength is absorbed, and the excited species undergo a hydrogen abstraction reaction from the surrounding hydrogen donor to generate radicals, which serve as a polymerization initiator and start polymerization of the radically polymerizable compound.

As the intramolecular cleavage-type photoradical polymerization initiator, an alkylphenone-based photoradical polymerization initiator, an acylphosphine-oxide-based photoradical polymerization initiator, and an oxime-ester-based photoradical polymerization initiator are known. These are the types in which bonds adjacent to the carbonyl group are a-cleaved to form radical species. Examples of the alkylphenone-based photoradical polymerization initiator include a benzyl methyl ketal-based photoradical polymerization initiator, an a-hydroxyalkylphenone-based photoradical polymerization initiator, and an aminoalkylphenone-based photoradical polymerization initiator. Specific compounds include, for example, 2,2'-dimethoxy-1,2-diphenylethane-1-one (for example, as a commercial product, trade name: Irgacure™ 651, manufactured by BASF Co., Ltd.) as a benzyl methyl ketal-based radical polymerization initiator, 2-hydroxy-2-methyl-1-phenylpropane-1-one (for example, as a commercial product, trade name: DAROCUR™ 1173, manufactured by BASF), 1-hydroxycyclohexylphenyl ketone (for example, as a commercial product, trade name: Irgacure™ 184, manufactured by BASF Co., Ltd.), 1-[4-(2-hydroxyethoxy) phenyl]-2-hydroxy-2methyl-1-propane-1-one (for example, as a commercial product, trade name: Irgacure™ 2959, manufactured by BASF Co., Ltd.), 2-hydroxy-1{4-[4-(2-hydroxy-2-methylpropionyl) benzyl]phenyl}-2-methylpropane-1-one (for example, as a commercial product, trade name: Irgacure™ 127, manufactured by BASF Co., Ltd.) as an a-hydroxyalkylphenone-based radical polymerization initiator, and, aminoalkylphenone-based photoradical polymerization initiator includes, but are not limited to, 2-methyl-1-(4-methylthiophenyl)-1-morpholinopropane-2-one (for example, as a commercial product, trade name: Irgacure™ 907, manufactured by BASF Co., Ltd.) or 2-benzylmethyl-2-dimethylamino-1-(4-morpholinophenyl)-1-butanone (for example, as a commercial product, trade name: Irgacure™ 369, manufactured by BASF Co., Ltd.). Examples of the acylphosphine oxide-based photoradical polymerization initiator include, but are not limited to, 2,4,6-trimethylbenzoyldiphenylphosphine oxide (for example, as a commercial product, trade name: Lucillin TPO, manufactured by BASF) and bis(2,4,6-trimethylbenzoyl)-phenylphosphine oxide (for example, as a commercial product, trade name: Irgacure™ 819, manufactured by BASF Co., Ltd.). Examples of the oxime ester-based photoradical polymerization initiator include, but are not limited to, (2E)-2-(benzoyloxyimino)-1-[4-(phenylthio) phenyl]octane-1-one (for example, as a commercial product, trade name: Irgacure™ OXE-01, manufactured by BASF Co., Ltd.). An example of a trade name is shown in parentheses.

The hydrogen abstraction type photoradical polymerization initiator includes, but is not limited to, anthraquinone derivatives such as 2-ethyl-9,10-anthraquinone, 2-t-butyl-9,10-anthraquinone, and thioxanthone derivatives such as isopropylthioxanthone, 2,4-diethylthioxanthone.

These photoradical polymerization initiators may be used alone or in combination of two or more types. It may also be used in combination with a thermal radical polymerization initiator described later.

The amount of the photoradical polymerization initiator added is preferably from 0.1 parts by mass to 15 parts by mass, more preferably from 0.1 parts by mass to 10 parts by mass, with respect to 100 parts by mass of the radically polymerizable compound. When the photoradical polymerization initiator is 0.1 parts by mass or more, polymerization is sufficient. When the amount of the photoradical polymerization initiator is 15 parts by mass or less, the molecular weight is sufficiently increased, and heat resistance or impact resistance is sufficiently obtained.

[Thermal Radical Polymerization Initiator]

As the thermal radical polymerization initiator, as long as radicals are generated by heating, there are no particular restrictions, and conventionally known compounds can be used, and for example, azo compounds, peroxides, persulfates and the like can be exemplified as preferred ones. Examples of the azo compound include 2,2'-azobisisobutyronitrile, 2,2'-azobis(methylisobutyrate), 2,2'-azobis-2,4-dimethylvaleronitrile, and 1,1'-azobis(1-acetoxy-1-phenylethane). Examples of peroxides include benzoyl peroxide, di-t-butylbenzoyl peroxide, t-butylperoxypivalate, and di(4-t-butylcyclohexyl)peroxydicarbonate. Examples of the persulfate include persulfate such as ammonium persulfate, sodium persulfate and potassium persulfate.

The amount of the thermal radical polymerization initiator added is preferably from 0.1 parts by mass to 15 parts by mass, more preferably from 0.1 parts by mass to 10 parts by mass, with respect to 100 parts by mass of the radically polymerizable compound. When the thermal radical polymerization initiator is 0.1 parts by mass or more, polymerization is sufficient. When the amount of the thermal radical polymerization initiator is 15 parts by mass or less, the molecular weight is sufficiently increased, and heat resistance or impact resistance is sufficiently obtained.

<Other Ingredients (Additives)>

The curable resin composition of the present disclosure may contain various additives as other optional components within a range that does not impair the object and effect of the present disclosure. The amount of the additive is preferably 0.05 to 25 parts by mass based on 100 parts by mass of the total of the core-shell type rubber particles, the radically polymerizable compound and the radical polymerization initiator. More preferably, 0.1 to 20 parts by mass.

For example, resins such as epoxy resin, polyurethane, polychloroprene, polyester, polysiloxane, petroleum resin, xylene resin, ketone resin, cellulose resin, or polycarbonate, modified polyphenylene ether, polyamide, polyacetal, polyethylene terephthalate, polybutylene terephthalate, ultra-high molecular weight polyethylene, polyphenylsulfone, polysulfone, polyarylate, polyetherimide, polyether ether ether ketone, polyphenylene sulfide, polyether sulfone, polyamideimide, liquid crystal polymer, engineering plastics such as polytrafluoroethylene, polychlorotrifluoroethylene, and polyvinylidene fluoride, fluorinated oligomer, silicone oligomer, polysulfide oligomer, soft metal such as gold, silver, lead, graphite, disulfiuoride molybdenum disulfide, tungsten disulfide, boron nitride, graphite fluoride, calcium fluoride, barium fluoride, lithium fluoride, silicon nitride, a layered crystal structure material such as molybdenum selenide may be added.

A polymerization inhibitor such as phenothiazine, 2,6-di-t-butyl-4-methylphenol, a benzoin compound, an acetophenone compound, an anthraquinone compound, a thioxanthone compound, a ketal compound, a benzophenone compound, a tertiary amine compound and a xanthone compound may be added as the photosensitizer.

Other additives include a polymerization initiator, a leveling agent, a wettability improver, a surfactant, a plasticizer, an ultraviolet absorber, a silane coupling agent, an inorganic filler, a pigment, a dye, an antioxidant, a flame retardant, a thickener, a defoaming agent and the like.

<Curable Resin Composition>

The composition is prepared by charging an appropriate amount of core-shell type rubber particles, a radically polymerizable compound, a radical polymerization initiator, and other optional components as necessary into a stirring vessel, and stirring the mixture at 20 to 120° C., preferably 40 to 100° C. Then, the composition can be produced by removing volatile solvents or the like as necessary.

The curable resin composition according to the present disclosure can be suitably used as a material for a shaped product used in a stereolithography. That is, by selectively irradiating the curable resin composition with an active energy ray such as ultraviolet/visible light, electron beam, X-ray, radiation, etc., and supplying energy necessary for curing, a shaped product having a desired shape can be produced. When the curable resin composition of the present disclosure is used as a molding material for a stereolithography, the viscosity at 25° C. is preferably 50 mPa·s to 5,000 mPa·s, more preferably 70 mPa·s to 4,000 mPa·s.

<Method for Producing a Cured Product>

The cured product can be produced by curing the curable resin composition of the present disclosure using a known method such as active energy beam irradiation or heat irradiation. Examples of active energy rays include ultraviolet and visible rays, electron beams, X-rays, and radiation. Among them, ultraviolet and visible light having a wavelength of 300 nm or more and 450 nm or less can be preferably used in view of ease of availability and compatibility with the photoradical polymerization initiator. An ultraviolet/visible light laser (for example, Ar laser, He—Cd laser, etc.), a mercury lamp, a xenon lamp, a halogen lamp, a fluorescent lamp, or the like can be used as the light source of the ultraviolet/visible light. Above all, the laser light source is preferably adopted because it can shorten the molding time by increasing the energy level, and can obtain high shaping accuracy with excellent light condensing property. The curing method can be appropriately selected according to the kind of radical polymerization initiator contained in the curable resin composition. The curing method may be used alone or in combination with a plurality of curing methods.

<Method for Producing Three-Dimensional Shaped Product>

The curable resin composition of the present disclosure can be suitably used as a shaping material for a stereolithography. The three-dimensional shaped product obtained by curing the curable resin composition of the present disclosure can be produced by using a known stereolithography and apparatus. A typical example of a preferred stereolithography is a method having a step of shaping a shaped product by photocuring a curable resin composition for each layer based on slice data generated from three-dimensional shape data of a three-dimensional model. Specifically, the cured layer is formed by selectively irradiating the active energy ray on the basis of the slice data so as to obtain the cured layer having a desired pattern in the liquid curable resin composition. Next, an uncured layer made of a liquid curable resin composition is supplied in contact with the cured layer, and a cured layer continuous with the cured layer is newly formed by irradiating the active energy ray based on slice data. By repeating the lamination process, a desired three-dimensional shaped product corresponding to the three-dimensional model can be finally obtained.

In forming each cured resin layer having a desired shape pattern by irradiating an uncured layer of a curable resin composition with an active energy ray, the active energy ray focused in a point shape like a laser beam may be irradiated in a point drawing system or a line drawing system. In addition, it is also possible to adopt a method in which the uncured layer is irradiated with active energy rays in a planar shape through a planar drawing mask formed by arranging a plurality of minute optical shutters such as a liquid crystal shutter or a digital micromirror shutter.

A typical example of the stereolithography is as described below. First, a supporting stage arranged to be vertically movable in a container accommodating the curable resin composition in a liquid state is lowered (settled) only in a predetermined quantity based on slice data from a liquid surface of the resin composition, to thereby form a thin layer (1) of the curable resin composition on the supporting stage. Then, the thin layer (1) is selectively irradiated with light to form a cured layer (1) which has been cured into a solid state. Then, the curable resin composition is supplied onto the cured layer (1) to newly form a thin layer (2), and the thin layer (2) is selectively irradiated with light, to thereby form a new cured layer (2) on the cured layer (1) in such a manner as to be continuous thereto and integrally stacked thereon. Then, while the pattern to be irradiated with light is changed or unchanged based on the slice data, this process is repeated a predetermined number of times, to thereby shape a shaped product in which a plurality of cured layers (1, 2, . . . n) are integrally stacked.

The shaped product thus obtained is taken out of the container, followed by cleaning or the like as required to remove an unreacted curable resin composition remaining on its surface. As a cleaning agent, there may be used, for example: alcohol-based organic solvents typified by alcohols, such as isopropyl alcohol and ethyl alcohol; ketone-based organic solvents typified by acetone, ethyl acetate, and methyl ethyl ketone; and aliphatic organic solvents typified by terpenes. After removing an unreacted curable resin composition, post-curing may be performed by an active energy ray or heat as required. The post-curing can cure the unreacted curable resin composition remaining on the surface and inside of the shaped product, and hence can suppress stickiness of the surface of the shaped product, and besides, can enhance the initial strength of the shaped product.

Example

Hereinafter, the present disclosure will be described in detail with reference to examples, but the present disclosure is not limited to these examples.

Materials

Materials used in the Examples and Comparative Examples are listed below.
[Radically Polymerizable Compound]
- B-1: Bifunctional urethane acrylate (product name: KAYARAD UX-6101, manufactured by Nippon Kayaku Co., Ltd., weight average molecular weight (actual measurement): $6.7 \times 10^3$)
- B-2: Bifunctional urethane acrylate (product name: KAYARAD UX-8101, manufactured by Nippon Kayaku Co., Ltd., weight average molecular weight (actual measurement): $3.3 \times 10^3$)
- B-3: Acryloyl morpholine (product name: ACMO, manufactured by KJ Chemicals)
- B-4: N-phenylmaleimide (product name: Imirex-P, manufactured by Nippon Shokubai)
- B-5: Isobornyl methacrylate
- B-6: Isobornyl acrylate
- B-7: N-vinyl-F-caprolactam
- B-8: Polycarbonate diol diacrylate (trade name: UM-90 (1/3) DM, manufactured by Ube Industries, Ltd., molecular weight: approximately 900)

In B-1 to B-8, B-1, B-2, and B-8 are radically polymerizable compounds having a molecular weight of 500 or more, B-5 and B-6 are (meth) acrylate based compounds having an alicyclic hydrocarbon group, and B-3, B-4, and B-7 are other radically polymerizable compounds.
[Radical Polymerization Initiator]
- C-1: Photoradical generator (product name: Irgacure 819, made by BASF)

<Evaluation and Measurement Methods>
[Average Particle Size of Core-Shell Type Rubber Particles]
Using a particle size distribution meter (Zetasizer Nano ZS manufactured by Malvern), approximately 1 ml of an acetone dispersion of core-shell type rubber particles was placed in a glass cell, and the arithmetic average particle size was measured at 25° C.
[Ratio of Compound with Molecular Weight of 500 or More in Radically Polymerizable Compound]
Gel Permeation Chromatography (GPC) apparatus (Tosoh's HLC-8220 GPC) was equipped with two Shodex GPC LF-804 columns (manufactured by Showa Denko K.K., Limit of elimination molecular weight: $2 \times 10^6$, Separation range: 300 to $2 \times 10^6$) in series, and THF was used as a developing solvent at 40° C., and a molecular weight distribution (retention time-detection intensity curve) was obtained by an RI (Refractive Index, Differential Refractive Index) detector. The molecular weight distribution was divided by the retention time corresponding to the molecular weight of 500 derived from the calibration curve in terms of standard polystyrene, and the ratio ($Y/X \times 100$ [%]) of the area (Y) having the molecular weight of 500 or more to the total area (X) was calculated to obtain the compound ratio having the molecular weight of 500 or more.
[Charpy Impact Strength]
According to JIS K 7111, a notch with a depth of 2 mm and a depth of 450 was formed in the center of the specimen by a notch forming machine (product name: Notching Tool A-4, manufactured by Toyo Seiki). Using an impact testing machine (product name: IMPACT TESTER IT, manufactured by Toyo Seiki), the specimen was fractured at an energy of 2 J from the back of the notch. The energy required for the fracture was calculated from the angle to which a hammer, which had been swung up to 150°, swung up after the fracture of the test piece, and it was used as the Charpy impact strength and an index of impact resistance.
[Viscosity of Curable Resin Composition]
Viscosity was measured by the rotary rheometer method. Concretely, the measurement was performed as follows using a viscoelastic measuring device (trade name: Physica MCR 302, manufactured by Anton Paar).
About 0.5 mL of the sample was filled to a measuring instrument equipped with a cone-plate type measuring jig (product name: CP 25-2, manufactured by Anton Paar; 25 mm diameter 2°) with, and adjust the temperature to 25° C. The measurement was performed at a constant shear rate of 5 $s^{-1}$ with a data interval of 6 seconds and the value at 120 seconds was defined to be the viscosity.
<Production of Acetone Dispersion of Core-Shell Type Rubber Particles>

Production Example 1

185 parts by mass of polybutadiene latex (product name: Nipol LX 111 A2, manufactured by Nippon Zeon) (corresponding to 100 parts by mass of polybutadiene rubber particles) and 315 parts by mass of deionized water were charged into a 1 L glass container, and the mixture was stirred at 60° C. while performing nitrogen substitution. Then, 0.005 parts by mass of disodium ethylenediaminetetraacetate (EDTA), 0.001 parts by mass of ferrous sulfate-7 hydrate and 0.2 parts by mass of sodium formaldehyde sulfoxylate were added to prepare polybutadiene rubber particles as the core layer. Thereafter, by continuously adding a mixture of 35 parts by mass of the radically polymerizable compound forming the shell layer (17.5 parts by mass of methyl methacrylate (MMA) and 17.5 parts by mass of isobornyl methacrylate (IBMA)) and 0.1 parts by mass of cumene hydroperoxide over 2 hours, the radically polymerizable compound was graft-polymerized on the surface of the polybutadiene rubber particles. After the addition was completed, the reaction was further stirred for 2 hours to obtain an aqueous dispersion of core-shell type rubber particles each having a polybutadiene rubber as a core layer and a copolymer of MMA and IBMA as a shell layer.

The aqueous dispersion of the core-shell type rubber particles obtained as described above was charged into 450 parts by mass of acetone and mixed uniformly. The supernatant was removed after centrifugation at 12000 rpm for 30 minutes at 10° C. using a centrifuge. An acetone dispersion of the core-shell type rubber particles A-1 was obtained by adding acetone to the sedimented core-shell type rubber particles, redispersing them, centrifuging them under the same conditions as described above, and removing the supernatant liquid twice. The average particle size of the core-shell type rubber particles A-1 was 0.25 μm.

Production Examples 2 to 5

An acetone dispersion of core-shell type rubber particles was obtained in the same manner as in Production Example 1 except that the composition of the radically polymerizable compound forming the shell layer was changed as shown in Table 1. The respective average particle size of the core-shell type rubber particles was as shown in Table 1.

Production Example 6

185 parts by mass of polybutadiene latex (product name: Nipol LX 111 A2, manufactured by Nippon Zeon) (corresponding to 100 parts by mass of polybutadiene rubber particles) and 300 parts by mass of deionized water were charged into a 1 L glass container, and the mixture was stirred at room temperature while performing nitrogen substitution. Thereafter, a mixture of 35 parts by mass (17.5 parts by mass of methyl methacrylate (MMA) and 17.5 parts by mass of isobornyl methacrylate (IBMA)) of a radically polymerizable compound forming a shell layer and 0.1 parts by mass of cumene hydroperoxide was added at a stretch and the obtained mixture was stirred at room temperature for 2 hours. After heating the stirred mixture at 60° C., an aqueous solution prepared by dissolving 0.005 parts by mass of disodium ethylenediaminetetraacetate (EDTA), 0.001 parts by mass of ferrous sulfate-7 hydrate and 0.2 parts by mass of sodium formaldehyde sulfoxylate in 15 parts by mass of deionized water was added to the stirred mixture to form a shell layer comprising a polymer of a radically polymerizable compound on the surface of polybutadiene rubber particles as a core layer. The reaction was terminated by stirring at 60° C. for 2 hours to obtain an aqueous dispersion of core-shell type rubber particles having a polybutadiene rubber as a core layer and a copolymer of MMA and IBMA as a shell layer.

An aqueous dispersion of the core-shell type rubber particles obtained as described above was charged into 450 parts by mass of acetone and mixed uniformly. The supernatant was removed after centrifugation at 12000 rpm for 30 minutes at 10° C. using a centrifuge. An acetone dispersion of the core-shell type rubber particles A-4 was obtained by adding acetone to the sedimented core-shell type rubber particles, redispersing them, centrifuging them under the same conditions as described above, and removing the supernatant liquid twice. The average particle size of the core-shell type rubber particles A-4 was 0.26 μm.

TABLE 1

| Production Example | | 1 | 2 | 3 | 4 | 5 |
|---|---|---|---|---|---|---|
| Rubber particle | | A-1 | A-2 | A-3 | D-1 | D-2 |
| Core layer [parts by mass] | Polybutadiene rubber particle | 100 | 100 | 100 | 100 | 100 |
| Shell layer [parts by mass] | (MMA) | 17.5 | 17.5 | 17.5 | 35 | 17.5 |
| | (IBMA) | 17.5 | 0 | 0 | 0 | 0 |
| | (IBA) | 0 | 17.5 | 0 | 0 | 0 |
| | (DCPMA) | 0 | 0 | 17.5 | 0 | 0 |
| | (St) | 0 | 0 | 0 | 0 | 17.5 |
| Average diameter [μm] | | 0.25 | 0.26 | 0.26 | 0.25 | 0.27 |

Example 1

An acetone dispersion of the core-shell type rubber particles A-1 (18 parts by mass solid content); B-1 (30 parts by mass) and B-2 (10 parts by mass) as radically polymerizable compounds having a molecular weight of 500 or more; B-3 (50 parts by mass) as other radically polymerizable compounds; B-5 (10 parts by mass) as a metacrylate compound having an alicyclic hydrocarbon group; and C-1 (2 parts by mass) as a radical polymerization initiator were mixed uniformly. The curable resin composition was obtained by removing acetone as a volatile component.

A cured product was prepared from the prepared curable resin composition by the following method. First, a mold having a length of 80 mm, a width of 10 mm, and a thickness of 4 mm was sandwiched between two pieces of quartz glass, and a curable resin composition was poured into the mold. The poured curable resin composition was alternately irradiated with 5 mW/cm$^2$ of ultraviolet rays from both sides of the mold 4 times for 120 seconds by an ultraviolet irradiation machine (product name: LIGHT SOURCE EXECURE 3000, made by HOYA CANDEO OPTRONICS). The cured product thus obtained was subjected to heat treatment by placing in a heating oven at 50° C. for 1 hour and placing in a heating oven at 100° C. for 2 hours, thus a test piece having a length of 80 mm, a width of 10 mm, and a thickness of 4 mm was obtained.

Table 2 shows the viscosity of the curable resin compositions and the Charpy impact strength of the cured products.

Examples 2 to 9 and Comparative Examples 1 to 4

A curable resin composition and a cured product were obtained in the same manner as in Example 1 except that the components shown in Table 2 were used. Table 2 shows the viscosity of the curable resin composition and the Charpy impact strength of the cured product.

Example 10

A curable resin composition prepared in the same manner as in Example 1 was used and to form a shaped product according to slice data based on a three-dimensional shape of a rectangular parallelepiped having a size of 80 mm×10 mm×4 mm by using a 3D printer (DWS-020X manufactured by DWS Co., Ltd., optical shaping device for regulating liquid level method). The resulting shaped product was irradiated with ultraviolet light using a UV Curing Unit M (manufactured by DWS Co.) for 30 minutes, then placed in a heated oven at 50° C. for 1 hour, then placed in a heated oven at 100° C. for 2 hours to obtain a test piece.

TABLE 2

|  |  | Example | | | | | | | | | | Comparative Example | | | |
|---|---|---|---|---|---|---|---|---|---|---|---|---|---|---|---|
|  |  | 1 | 2 | 3 | 4 | 5 | 6 | 7 | 8 | 9 | 10 | 1 | 2 | 3 | 4 |
| Core-shell type rubber particle [part by mass] | A-1 | 18 |  |  | 18 | 18 |  |  |  | 18 | 18 |  |  | 18 | 18 |
|  | A-2 |  | 18 |  |  |  |  |  |  |  |  |  |  |  |  |
|  | A-3 |  |  | 18 |  |  |  |  |  |  |  |  |  |  |  |
|  | A-4 |  |  |  |  |  | 18 | 11 | 18 |  |  |  |  |  |  |
|  | D-1 |  |  |  |  |  |  |  |  |  |  | 18 |  |  |  |
|  | D-2 |  |  |  |  |  |  |  |  |  |  |  | 18 |  |  |
| Radical polymerizable compound (part by mass) | B-1 | 30 | 30 | 30 | 30 | 30 | 30 | 30 | 30 | 20 | 30 | 30 | 30 | 30 | 30 |
|  | B-2 | 10 | 10 | 10 |  |  |  |  |  |  | 10 | 10 | 10 |  |  |
|  | B-3 | 50 | 50 | 50 | 70 | 50 | 30 | 30 |  | 50 | 50 | 50 | 50 | 20 |  |
|  | B-4 | 10 | 10 | 10 |  |  |  |  |  | 10 | 10 | 10 | 10 |  |  |
|  | B-5 |  |  |  |  | 20 |  |  |  |  |  |  |  | 50 |  |
|  | B-6 |  |  |  |  |  | 40 | 40 | 30 |  |  |  |  |  | 60 |
|  | B-7 |  |  |  |  |  |  |  | 40 |  |  |  |  |  | 10 |
|  | B-8 |  |  |  |  |  |  |  |  | 20 |  |  |  |  |  |
| Ratio of radical polymerizable compound having 500 or more molecular weight in radical polymerizable compound (% by mass) |  | 40 | 40 | 40 | 30 | 30 | 30 | 30 | 30 | 30 | 40 | 40 | 40 | 30 | 30 |
| Ratio of (meth)acrylate compound having alicyclic hydrocarbon group in radical polymerizable compound (% by mass) |  | 0 | 0 | 0 | 0 | 20 | 40 | 40 | 30 | 0 | 0 | 0 | 0 | 50 | 60 |
| Radical initiator (part by mass) | C-1 | 2 | 2 | 2 | 2 | 2 | 2 | 2 | 2 | 2 | 2 | 2 | 2 | 2 | 2 |
| Evaluation | Charpy impact strength (kJ/m$^2$) | 10.6 | 10.6 | 11.4 | 12.3 | 10.3 | 11.5 | 8.6 | 11.7 | 11.3 | 11.1 | 11.5 | 11.9 | 4.6 | 11.7 |
|  | Viscosity (mPa·s) | 1.8 | 1.9 | 2.0 | 0.8 | 1.0 | 1.8 | 0.8 | 1.0 | 1.2 | 1.8 | 5.2 | 8.3 | 4.7 | 7.2 |

According to the present disclosure, it is possible to provide a curable resin composition which can form a cured product excellent in impact resistance, has a low viscosity and is excellent in workability in producing a cured product.

The present disclosure is not limited to the embodiments described above, and various modifications and variations are possible without departing from the spirit and scope of the present disclosure. Accordingly, in order to make the scope of the present disclosure public, the following claims are attached.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A curable resin composition comprising
a core-shell type rubber particle having a core layer and a shell layer;
a radically polymerizable compound having one or more radically polymerizable functional groups in a molecule; and
a radical polymerization initiator,
wherein the shell layer contains a polymer having an alicyclic hydrocarbon group in a side chain, with a proviso that it is not a cyclohexyl (meth) acrylate polymer,
wherein the radically polymerizable compound contains a polymerizable compound having a molecular weight of 500 or more in a ratio of 2 mass % to 70 mass %, and
wherein the radically polymerizable compound does not contain a (meth) acrylate compound having an alicyclic hydrocarbon group.

2. The curable resin composition according to claim 1, wherein a content of the core-shell type rubber particle is 7 parts by mass to 65 parts by mass based on 100 parts by mass of the radically polymerizable compound.

3. A cured product obtained by curing the curable resin composition according to claim 1.

4. The cured product according to claim 3,
wherein Charpy impact strength of the cured product is 8.6 kJ/m$^2$ to 12.3 kJ/m$^2$.

5. A method for producing a three-dimensional shaped product, which comprises a step of forming a shaped product by photocuring a curable resin composition for each layer based on slice data, wherein:
the curable resin composition is the curable resin composition according to claim 1.

6. The curable resin composition according to claim 1, wherein viscosity of the curable resin composition at 25° C. is 0.05 Pa·s to 4.0 Pa·s, and
wherein the polymer having the alicyclic hydrocarbon group in the side chain is a polymer of a radically polymerizable compound having carbocycles.

7. The curable resin composition according to claim 1, wherein a content of the core-shell type rubber particle is 10 parts by mass to 60 parts by mass based on 100 parts by mass of the radically polymerizable compound.

8. A curable resin composition comprising
a core-shell type rubber particle having a core layer and a shell layer;
a radically polymerizable compound having one or more radically polymerizable functional groups in a molecule;
a radical polymerization initiator,
wherein the shell layer contains a polymer having an alicyclic hydrocarbon group in a side chain, with a proviso that it is not a cyclohexyl (meth) acrylate polymer, wherein the radically polymerizable compound contains a polymerizable compound having a molecular weight of 500 or more in a ratio of 2 mass % to 70 mass %, wherein the radically polymerizable compound contains a (meth) acrylate compound having a molecular weight of less than 500 and having an alicyclic hydrocarbon group in a ratio of more than 0 mass % to less than 50 mass %, and wherein a content of the core-shell type rubber particle is 10 parts by mass to 60 parts by mass based on 100 parts by mass of the radically polymerizable compound.

9. The curable resin composition according to claim 8, wherein the radically polymerizable compound having the molecular weight of 500 or more is a polyfunctional urethane (meth) acrylate having at least 2 (meth) acryloyl groups and at least 2 urethane groups.

10. The curable resin composition according to claim 8, wherein the core-shell type rubber particle has an average particle size of 0.02 μm to 5 μm.

11. The curable resin composition according to claim 8, wherein the core layer of the core-shell type rubber particle contains at least one selected from the group consisting of butadiene rubber, crosslinked butadiene rubber, styrene/butadiene copolymer rubber, acrylic rubber, silicone/acrylic composite rubber, and urethane rubber.

12. The curable resin composition according to claim 8, wherein a mass ratio of the core layer of the core-shell type rubber particle is 1 to 200 parts by mass with respect to 100 parts by mass of the shell layer of the core-shell type rubber particle.

13. The curable resin composition according to claim 8, wherein the radically polymerizable compound having the molecular weight of 500 or more contains at least a polyether structure or a polyester structure.

14. A method for producing a three-dimensional shaped product, which comprises a step of forming a shaped product by photocuring a curable resin composition for each layer based on slice data, wherein:

the curable resin composition is the curable resin composition according to claim 8.

15. A cured product obtained by curing the curable resin composition according to claim 8.

16. The curable resin composition according to claim 8, wherein viscosity of the curable resin composition at 25° C. is 0.8 Pa·s to 5.0 Pa·s, and wherein the polymer having the alicyclic hydrocarbon group in the side chain is a polymer of a radically polymerizable compound having carbocycles.

17. The curable resin composition according to claim 8, wherein the curable resin composition contains the radically polymerizable compound having the molecular weight of 500 or more in a ratio of 5 mass % to 65 mass %.

18. The curable resin composition according to claim 8, wherein the polymer having the alicyclic hydrocarbon group in the side chain is a polymer selected from the group consisting of isobornyl (meth) acrylate, dicyclopentanyl (meth) acrylate, dicyclopentenyl (meth) acrylate, 2-methyl-2-adamantyl (meth) acrylate, 2-ethyl-2-adamantyl (meth) acrylate, dimethylol tricyclodecandi (meth) acrylate, and cyclohexylmaleimide.

19. A curable resin composition comprising a core-shell type rubber particle having a core layer and a shell layer;

a radically polymerizable compound having one or more radically polymerizable functional groups in a molecule;

a radical polymerization initiator, wherein the shell layer contains a polymer having an alicyclic hydrocarbon group in a side chain, with a proviso that it is not a cyclohexyl (meth) acrylate polymer, wherein the radically polymerizable compound contains a polymerizable compound having a molecular weight of 500 or more in a ratio of 2 mass % to 70 mass %, wherein the radically polymerizable compound contains a (meth) acrylate compound having a molecular weight of less than 500 and having an alicyclic hydrocarbon group in a ratio of more than 0 mass % to less than 50 mass %, and wherein viscosity of the curable resin composition at 25° C. is 0.05 Pa·s to 5.0 Pa·s.

20. The curable resin composition according to claim 19, wherein the polymer having the alicyclic hydrocarbon group in the side chain is a polymer of selected from the group consisting of isobornyl (meth) acrylate, dicyclopentanyl (meth) acrylate, dicyclopentenyl (meth) acrylate, 2-methyl-2-adamantyl (meth) acrylate, 2-ethyl-2-adamantyl (meth) acrylate, dimethylol tricyclodecandi (meth) acrylate, and cyclohexylmaleimide.

\* \* \* \* \*